Aug. 11, 1964  R. C. FUERHOFF  3,144,186
APPARATUS FOR CUTTING OFF LENGTHS OF TUBING
Filed June 15, 1962  2 Sheets-Sheet 1
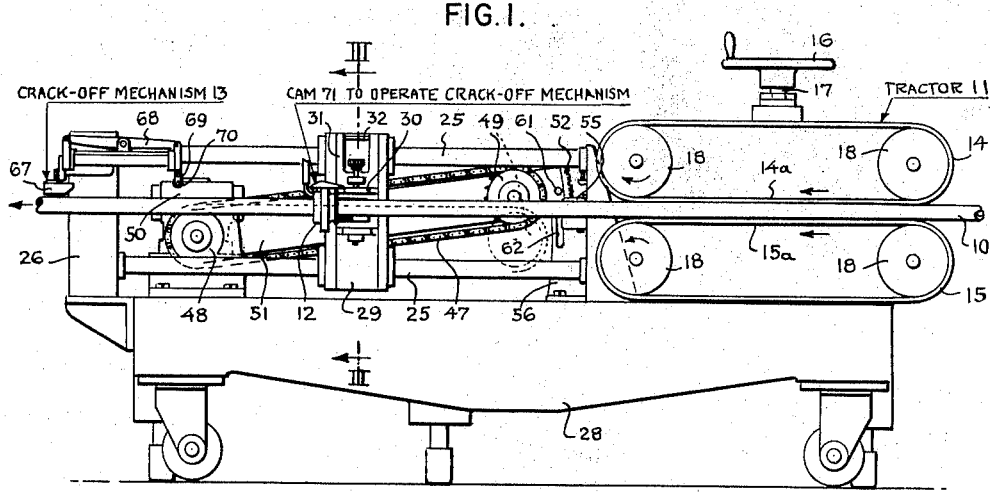
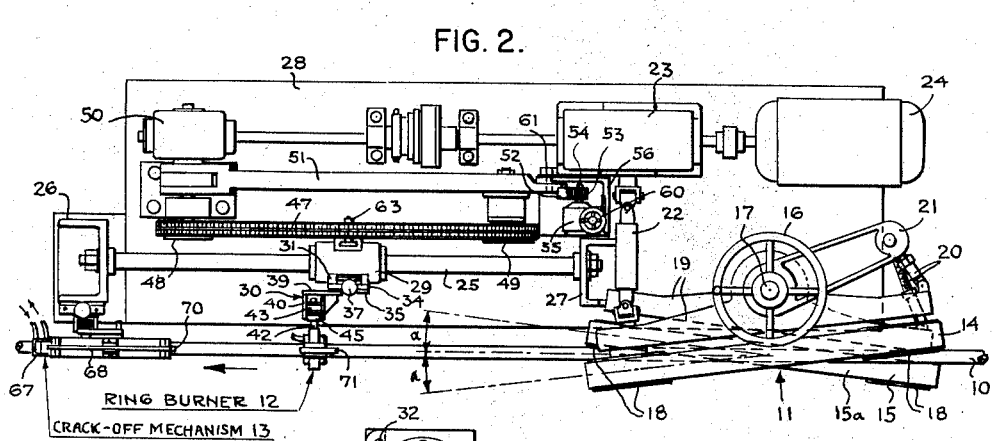
INVENTOR.
RALPH C. FUERHOFF
BY
W. D. Palmer
ATTORNEY.

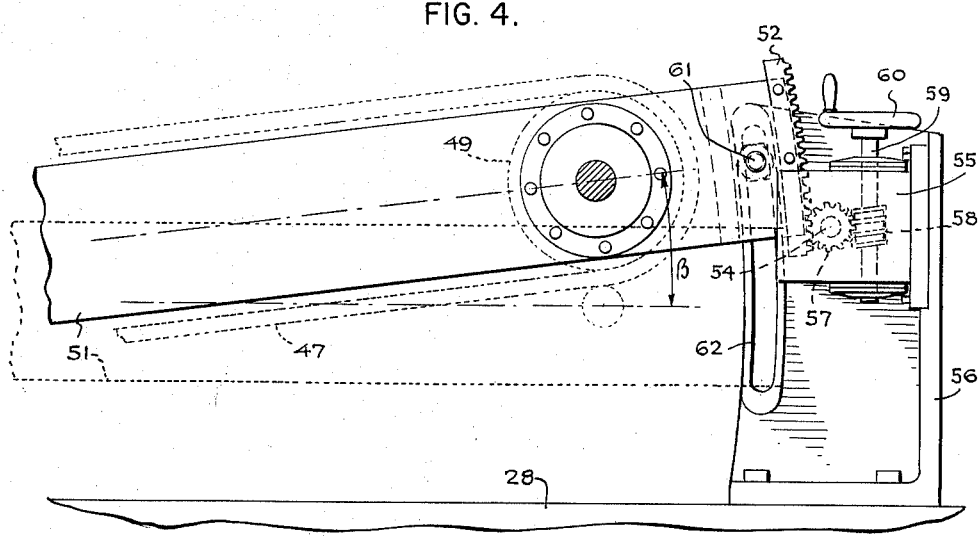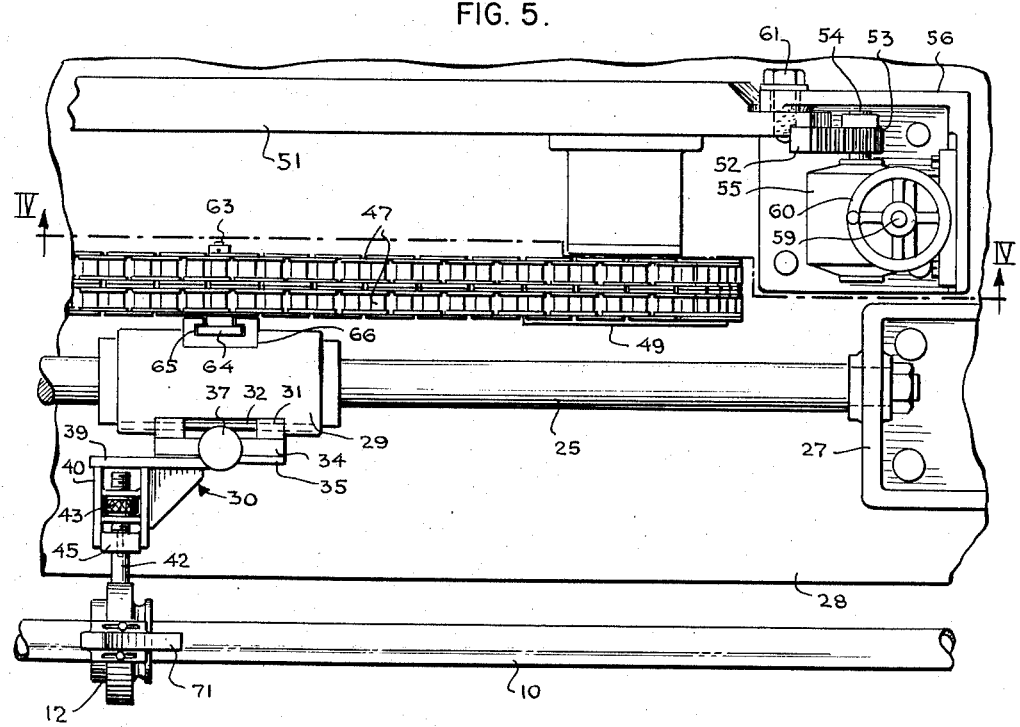

United States Patent Office 3,144,186
Patented Aug. 11, 1964

3,144,186
APPARATUS FOR CUTTING OFF LENGTHS
OF TUBING
Ralph C. Fuerhoff, Bay Village, Ohio, assignor to Westinghouse Electric Corporation, East Pittsburgh, Pa., a corporation of Pennsylvania
Filed June 15, 1962, Ser. No. 202,894
10 Claims. (Cl. 225—93.5)

This invention relates to apparatus producing a circular line of cleavage in vitreous tubing for breaking off a section of the tubing thereat, and has particular application in producing desired sections of glass tubing of exact length for use in the manufacture of fluorescent lamps.

Primarily, the invention generally considered, aims to obtain severed sections of tubing cracked off from a continuously supplied and moving source of tubing, with such accuracy of length and smoothness of end as not to require any further cutting or trimming in making use of the severed sections.

In its broad aspects, the invention is directed to cutting or cracking off sections of definite lengths of tubing while the tubing is both rotating and in longitudinal transit.

Important among the objects of the invention, is the maintenance of the flame, which prepares the crack-off location, to concentrate maximum heating therefrom on a planar circle circumferentially of the tubing, for obtaining precise length of the section of tubing severed thereat.

Likewise broadly considered, the invention proposes and accomplishes synchronization of advancement of the tubing and rate of travel therewith of the burner carriage and burner in approach toward the crack-off mechanism.

An essential object of the invention is to provide means for varying the rate of travel of the burner carriage and burner to agree precisely with the advancement of the tubing and to compensate for any adjustments introduced in rate of transit of the tubing.

In conjunction with accomplishment of the foregoing objectives, the invention provides a construction by which the precise length of the severed sections of tubing may be maintained agreeable to requirement of proposed use thereof.

The invention contemplates adaptability to operation upon any selected diameter of tubing without sacrifice of any of the objects stated hereinabove.

A detailed object of the invention is to enable change of rate of travel of the burner carriage while the machine continues in operation and without interrupting advancement of the tubing.

Other objects, advantages and novel features of construction will become apparent to persons skilled in the art to which the invention appertains as the description proceeds, both by direct recitation thereof and by implication from the context.

Referring to the accompanying drawings, in which like numerals of reference indicate similar parts throughout the several views:

FIGURE 1 is a front elevation of an apparatus embodying the present invention;

FIGURE 2 is a plan thereof;

FIGURE 3 is a cross section on line III—III of FIG. 1;

FIG. 4 is a sectional elevation, on large scale than FIG. 1, showing the beam-tilting mechanism, taken on line IV—IV of FIG. 5; and FIG. 5 is a plan of a mid-portion of the apparatus showing part of the same on larger scale than the showing of the same parts in FIG. 2.

In order to orient the present invention in its association with manufacture of the tubing, it should be initially understood that the glass or other vitreous material in molten state comes from a furnace and is formed as a hollow tube about a rotating mandrel, not shown, the glass rapidly changing from plastic state to a more and more rigid condition in transition upon and from that mandrel, and the present invention is dealing with the continuously formed rigid glass tubing identified herein by numeral 10.

As part of the herein disclosed apparatus, there is a tractor 11 which pulls the tubing 10 from the furnace, said tractor or tube-pulling means having a construction by which the tubing is both rotated and given a longitudinal transitional forward motion. Forwardly beyond said tractor, the tubing passes through a burner ring 12 which reciprocates back and forth, and on its forward stroke travels with and at the same rate of transition as the tubing. By this means, there is a continuous concentration of heat at a definite circumferential circle located in a plane perpendicular to and transverse to the axis of the tubing. For convenience, said plane will be referred to henceforth as the crack-off plane. At the forward end of the stroke of the burner 12 there is a crack-off mechanism 13 by which the section of the tubing ahead of the crack-off plane is caused to sever at said plane from the body of the tubing still on the approach side of said plane. It is this severed section of tubing which constitutes the desired product and which the apparatus is intended to furnish with exactitude of length and perfection of end surface.

Inasmuch as the aforementioned tractor 11 has a construction known in the art, detailed description thereof is not deemed necessary. Suffice it to say, that it includes two horizontally disposed continuous belts 14, 15, one above the other and arranged so that the lower reach 14a of the upper belt travels in the same general and forwardly direction as the upper reach 15a of the lower belt 15. The spacing between said reaches 14a and 15a is adjusted by a handwheel 16 and threaded shaft 17 to accommodate the chosen size of tubing to be pulled and rotated by said belts. The belts are, of course, mounted on rollers 18 with the pair of rollers for each belt carried by a beam 19 individual to the respective pair, each beam being adapted to swivel up-on the axis of said shaft 17. Turnbuckle or other means 20 for adjusting swiveled position of the beams are shown extending from a fixed arm 21 to the respective beams. One roller of each pair is driven through the agency of an extendable shaft 22 and gear-box connection 23 from a driving motor 24. The belts are arranged to make opposite angles $\alpha$ to the axis of the tubing, and in consequence thereof the belts will impart a rotary motion as well as a transitional forward motion to the tubing. Angles $\alpha$ should both be alike, and are adjusted by manipulation of said turnbuckles 20 to such a position to cause the belts to rotate the tubing at the same rate of rotation as imparted by the forming mandrel at the furnace exit. It is important to note that the change of angle of the belts, not only changes the rate of rotation of the tubing, but also changes the rate of transition of tubing, which is undesirable but is unavoidable.

The most important feature of the present invention is the provision of means for correspondingly changing the speed of advancement of the burner ring 12 to match the change of forward feeding of the tubing consequential upon any adjustment made in the swiveled position of the tractor belts 14, 15. In other words, it may be said that the change of rate of forward advancement of the tubing is an unfortunate result of having to change the rate of rotation in the use of a common means for effecting both the transition and rotation, and is compensated for, according to the present invention, by inclusion of means to independently regulate the rate of advancement of the burner to agree with the revised rate of transition of the tubing.

At a location behind the tubing as viewed from the front of the apparatus, and forwardly from where the tubing has been propelled by the belts 14, 15, are provided a pair of tracks 25 parallel to each other and to the tubing, with one of the tracks at a level higher than the tubing and the other track at a level lower than the tubing. The ends of said tracks are secured to brackets 26, 27 fixed on the base 28 of the apparatus, so that said tracks are immovable. A carriage 29 is slidably mounted on said tracks to reciprocate back and forth thereon always in parallelism to the tubing, and as viewed from the front of the apparatus, is behind said tubing.

Carried by and at the front of said carriage, that is, at the face of the carriage directed toward said tubing and toward the front of the apparatus, there is a suitable burner-ring supporting or heating means 30 which intervenes between the carriage and tubing. The particular means herein shown, on an enlarged scale in FIG. 3, comprises a swingable flap 31 hinged, as by hinge-pin 32 at the top of the carriage so as to normally gravitate to a vertical position into a receiving hollow at the front of the carriage. Fixed on and projecting from the front face of said flap are two horizontally disposed ribs 34 which are spaced apart one above the other and provide front edges in a common plane. A plate 35 in held in slidable engagement with said front edges of said ribs, said plate having a vertically extending boss 36 projecting from its rear side. A vertical threaded hole is provided longitudinally through said boss with a screw 37 located therein, said screw projecting above and below said boss and passing, without benefit of threads, through the ribs 34 and adapted to rotate therein but prevented from longitudinal movement by collars 38 fixed on said screw and in engagement with said ribs. This screw mounting for the plate 35 is for the purpose of providing vertical adjustment of position for the burner ring 12.

The plate 35 is constituted as part of or integral with a right-angle bracket 39, the hip whereof is toward the forward end of the carriage. Said bracket is shown with a ladder-like formation of leg 40 projecting from the hip toward the tubing, said leg providing two rungs with aligned holes through which a shank 42 may be slid and guided parallel to the side struts of the ladder-like leg. A knurled nut 43 is situated between said rungs and has threaded engagement with said shank 42 for extending or retracting the shank with respect to said bracket leg, plate and carriage. By virtue of the ladder-like formation of the bracket leg 40, the longitudinal struts thereof may be employed conveniently to engage flat faces of a guide block 45 riding therebetween to prevent the shank from rotating. Said shank is fixed with respect both to said block and to aforementioned ring 12, in consequence of which said ring is prevented from twisting and is held in a plane perpendicular to the axis of the tubing. Appropriate manipulation of the knurled nut 43 on the horizontal shank 42 and manipulation of the vertical screw 37 carrying said plate 35 and bracket 39 supporting said shank and burner ring, enables said burner ring 12 to be located coaxially to the tubing 10. Since the tubing is parallel to the tracks 25 on which the carriage is mounted, the coaxial condition of ring and tubing will be maintained during the reciprocating travel of the ring and the continuous forward travel of the tubing.

It is important that the ring and tubing advance at the same rate, so that the flames 46 from the burner ring will be continuously applied to a precise circumferential circle in the length of the tubing 10 during the forward sweep or travel of the ring 12 and flames 46. The carriage 29 is propelled by a continuously traveling endless chain 47 (or carriage-moving means) passing around sprockets 48, 49 located in a common vertical plane behind the carriage parallel to the pair of tracks 25. The forward sprocket 48 has a driving connection through a gear box 50 from the same motor 24 by which the tubing is advanced. The gear ratios are established to obtain substantially the same rate of advancement of the chain 47 as is obtained for advancement of the tubing driving belt reaches 14a and 15a. As the rate of advancement of the tubing is altered by change of angle α of the belts to the tubing, the present invention provides means for making a corresponding change of angle β of the chain to the axis of the tubing, and thereby conform the rate of travel of the carriage and burner to the rate of travel of the tubing. By driving the belts 14 and 15 and the sprocket chain 47 from the same motor, and imparting the same linear speed to the belts and chain, it will follow that linear speed of the tubing and of the carriage will be equal when angles α and β are equal.

For convenience of distinguishing between the sprockets, the one above referred to as driven from the motor, will be identified as the forward sprocket 48 whereas the other one, which is proximate to the beginning of the forward stroke of the carriage, will be designated as the idler sprocket 49. This idler sprocket is carried at the front side of a beam 51 the forward end of which is trunnioned on the drive shaft of the forward sprocket 48, so that the rear end of said beam may swing up and down as may be required for adjustment of the angular disposition of the beam.

At the rear end of beam 51 there is a segment of an arcuate rack 52, the center of curvature of which is at the axis upon which the beam is trunnioned. A pinion 53 is rotatably mounted in mesh with said rack, whereby the beam may be swung up or down by rotation of the pinion. This pinion is carried by and secured to a horizontally directed rotatable stub shaft 54 which projects from and has bearing in a gear-box 55 supported in fixed position by a pedestal frame 56 standing upright from the apparatus base 28. Within said gear-box 55 and fixed on said rotatable stub shaft 54 is a worm gear 57. Also within the gear-box, is a worm 58 in mesh with said worm gear for rotating the same, said worm being an integral part with and coaxial with a vertically disposed rotatable stem 59 that projects upwardly from said gear-box with appropriate operating means, such as handwheel 60 secured thereon for manipulation of the operator. The worm, unless positively rotated by the operator turning the handwheel 60, will prevent the worm wheel from turning, and consequently the pinion meshing with arcuate rack 52 cannot turn, and thus the beam is not only swung to adjusted position by operation of the worm, but is also maintained in the adjusted position thereby. The foregoing mechanism thus comprises a beam-adjusting means.

To assure retention of the beam in exact position to which it is swung, positive locking means may be provided. In the present disclosure, the locking means comprises a bolt 61 threaded into the side of the beam, the shank of the bolt passing through an arcuate slot 62 in the pedestal 56, the margin of the beam end being appropriately in sliding engagement with the pedestal proximate to said slot and bolt. The center of curvature of said arcuate slot 62, is the same as for the arcuate rack 52, namely, at the axis on which the beam is trunnioned. With the bolt loosened, the beam may be swung up or down by manipulation of the handwheel 60, and when the beam is located at the desired angle, said bolt may be tightened, which thereby clamps the portion of the back face of the beam where juxtaposed to the pedestal tightly against the pedestal for immovable support therefrom during productive operation of the apparatus.

The longitudinal reaches of the sprocket chain 47 are parallel to the beam 51, and obviously change of angle of the beam correspondingly affects the inclination of those longitudinal reaches of the chain, so that the angle β for the beam also represents the angle of inclination of the longitudinal reaches of the chain. Inasmuch as the carriage travels always in a fixed horizontal direction and the chain travels not only at an angle β to the horizontal and also passes around the sprockets, making end loops in the chain travel thereat, and in its cycle moves any given point of the chain first along one reach and then in an opposite direction along the other reach, driving of the carriage by the chain must be such as to accommodate these circumstances. As shown, a stud 63 traverses the chain and is secured thereto, conveniently, but not necessarily, constituting one of the pivots for the overlapping links of the chain. At its end toward the carriage, said stud provides a disc-shaped head or roller 64 the rim of which rides in an undercut channel 65 of a vertically disposed track 66 constituted as a fixed part of the carriage. By virtue of this arrangement, longitudinal component of motion of the chain is imparted to the carriage, whereas vertical component merely results in roller 64 of the stud 63 riding in undercut channel 65 of track 66 without requiring or effecting any movement thereby of the carriage. The construction herein presented, therefore, enables the rate of forward movement of the carriage and burner mounted thereon, to be synchronized to match the forward movement of the tubing. By virtue of the exact synchronization, the ring of flames provided by the burner concentrates upon a definite restricted circle of the circumference of the tubing at a given diametric plane transverse to the tubing, so that the hottest part of the glass is a thin circle at which the glass will break with a perpendicular planar smooth end when sudden cooling is applied thereat.

Sudden cooling and crack-off of the tubing section is effected by crack-off or severing means 13, which may be briefly explained as comprising a water-cooled contactor 67 located immediately above the tubing and depressed thereagainst at the moment the hot spot of the tubing is directly thereunder. The contactor 67 is carried at one end of a first-class lever 68. The other end of said lever 68 has a pawl 69 suspended therefrom, said pawl having a roller 70 at its bottom end. A longitudinally directed cam 71 is provided in fixed relation to and on the top of the burner ring 12 in position to engage said roller 70 as the ring moves thereunder. By virtue of the suspension of the roller on said pawl, forward passage of the cam thereunder merely deflects the pawl without swinging said lever 68, but as the carriage moves in its retractive direction, the pawl cannot deflect and therefore raises that end of the lever and depresses the contactor at the opposite end of the lever. In the meantime, the tubing has continued to advance, bringing the hot spot into juxtaposition with the contactor at the moment of depression of said contactor, and crack-off of the tubing section takes place. The machine operates rapidly, so that the hot spot or heated circle around the tubing is still red hot upon arrival at the contactor, and the momentary touching of the cooled contactor with the tubing at its red-hot circle results in the tubing cracking off on a perpendicular plane defined by that circle.

In the prior art, the difference in rate of movement of the tubing and burner ring has produced an extended heated area longitudinally of the tubing, the location of the crack-off could not be precisely predicted, producing tube sections varying in length, and often with the ends not exactly perpendicular and often jagged in character. By virtue of the present invention, the exact location of the crack-off is definitely established and the crack-off effected with exactitude that produces a smooth perpendicular end to the tube section.

It will be recognized that the objects of the invention have been achieved by providing an improved apparatus for severing sections of tubing from a continuously supplied and moving source of tubing. The severed tubing sections have a definite, predetermined length and the crack-off portions of the tubing sections have such smoothness as not to require any further trimming. Constructional details for the improved apparatus have also been provided.

While one best embodiment of the invention has been illustrated and described in detail, it is to be particularly understood that the invention is not limited thereto or thereby.

I claim as my invention:

1. An apparatus for severing lengths of vitreous tubing, comprising belts disposed at an angle to and in contact with vitreous tubing for rotating and advancing said tubing in a straight path, a burner for heating said tubing in transit at a given location on said tubing where severing is to be effected, a carriage on which said burner is mounted, said carriage having a path of movement parallel to said tubing for advancing said burner in parallelism to and with said tubing, a continuous chain drive for said carriage with sprocket wheels therefor, one of said sprocket wheels being laterally movable to vary the angle of the said chain with respect to said path of movement of the carriage for synchronizing rate of movement of the carriage to that of the tubing.

2. An apparatus for severing lengths of vitreous tubing, comprising means for advancing said tubing in a straight path, a burner for heating said tubing in transit at a given location on said tubing where severing is to be effected, a carriage on which said burner is mounted, said carriage having a path of movement parallel to said tubing for advancing said burner in parallelism to and with said tubing, a continuous chain drive for said carriage with sprocket wheels therefor, a beam pivoted on the axis of one of said sprockets, said beam having the other of said sprockets mounted thereon at a distance from the said axis, whereby swinging said beam varies the angle of the said chain with respect to said path of movement of the carriage for synchronizing rate of movement of the carriage to that of the tubing.

3. An apparatus in accordance with claim 2, wherein means is provided for swinging and holding said beam.

4. An apparatus in accordance with claim 2, wherein an arcuate rack having its center of curvature at said axis is provided on said beam, and means meshing with said rack is provided for swinging and holding said beam.

5. An apparatus in accordance with claim 2, wherein said chain is connected to said carriage with means accommodating lateral component of movement of the chain with respect to the carriage.

6. An apparatus in accordance with claim 2, wherein crack-off mechanism is provided beyond the final forward position of travel of the carriage with a pawl operating means therefor operatively engaged as the carriage proceeds on its return movement.

7. Apparatus for severing predetermined lengths of tubing from a continuous strip of moving tubing, said apparatus comprising:

(a) tube-pulling means for rotating said tubing about its longitudinal axis at a controlled but variable rate and for simultaneously continuously advancing said tubing along its longitudinal axis at a controlled speed which varies with the tubing rotational rate;

(b) heating means for heating said moving tubing at a predetermined location where it is desired to sever said tubing;

(c) a carriage carrying said heating means, said carriage having a reciprocable path of movement which is parallel to the longitudinal path of movement of said tubing;

(d) carriage-moving means comprising an elongated endless drive carried on a beam, said endless drive moving at a predetermined rate of speed and connecting to said carriage to impart thereto that component of movement of said endless drive which parallels the longitudinal movement of said tubing;

(e) beam-adjusting means for varying the disposition of said beam with respect to said tubing so that the component of movement of said endless drive which parallels the longitudinal movement of said tubing can be varied to adjust the rate of advance of said carriage to equal the rate of longitudinal movement of said tubing; and (f) severing means for severing said tubing at that portion which has previously been heated by said heating means.

8. The apparatus as specified in claim 7, wherein said endless drive comprises a chain riding on sprockets.

9. The apparatus as specified in claim 7, wherein said heating means comprises a burner formed as a ring about said tubing.

10. The apparatus as specified in claim 7, wherein said severing means is actuated by movement of said carriage.

References Cited in the file of this patent

UNITED STATES PATENTS

| | | |
|---|---|---|
| 1,900,971 | Ashford | Mar. 14, 1933 |
| 2,157,067 | Brown et al. | May 2, 1939 |
| 2,310,469 | Snyder | Feb. 9, 1943 |
| 2,521,352 | Dockerty et al. | Sept. 5, 1950 |

FOREIGN PATENTS

| | | |
|---|---|---|
| 843,193 | Great Britain | Aug. 4, 1960 |